United States Patent
Ueno

[15] 3,637,124
[45] Jan. 25, 1972

[54] FILM INTERMITTENT FEED MECHANISM IN FILM PROJECTORS

[72] Inventor: Yasuo Ueno, Saitama-ken, Japan
[73] Assignee: Fuji Shashin Koki Kabushiki Kaisha, Saitama-ken, Japan
[22] Filed: July 30, 1969
[21] Appl. No.: 846,206

[30] Foreign Application Priority Data

Aug. 3, 1968 Japan..................................43/55018

[52] U.S. Cl.................................................226/62, 226/67
[51] Int. Cl. .......................................................G03b 1/22
[58] Field of Search ...............226/62, 67; 352/194, 195, 169

[56] References Cited

UNITED STATES PATENTS 3,261,654  7/1966  Faber et al............................352/194
3,471,227  10/1969  McClellan et al.......................352/169
3,520,596  7/1970  O'Donnell et al..................352/169 X Primary Examiner—Richard A. Schacher
Assistant Examiner—Gene A. Church
Attorney—Waters, Roditi, Schwartz & Nissen

[57] ABSTRACT

A film intermittent feed mechanism in a film projector, comprising claw means adapted to engage a row of perforations provided along a side edge of the film charged and cam means for operating said claw means to bring it in engagement with said film perforations and thereby to feed the film intermittently, said mechanism further comprising means for stopping feed of the film by holding said claw means out of engagement with the film perforations so as to obtain a still picture and means for advancing the film one frame during the still picture projecting operation so as to obtain a still picture of another frame.

2 Claims, 12 Drawing Figures

FILM INTERMITTENT FEED MECHANISM IN FILM PROJECTORS

BACKGROUND OF THE INVENTION

1. Field of the Invention

The present invention relates to a film projector, and more particularly to such a film projector which is capable of projecting not only a moving picture but also a still picture.

2. Description of the Prior Art

In a conventional film projector, a still picture of a selected frame of the film charged is obtained by stopping the operation of a film intermittent feed mechanism, consisting of a claw and a claw operating cam, and turning a lamp on. When the next frame of the film is desired to be placed in the projecting position thereafter, it is necessary to rotate a sector member by hand, which is not only cumbersome but also accompanied by the disadvantage that the picture projected on a screen is impaired by the sector which intercepts the light path during shifting of the frame.

SUMMARY OF THE INVENTION

It is an object of the present invention to provide a film projector of the type which comprises a film-driving mechanism having a claw adapted to drive a film in engagement with a row of perforations provided along a side edge of the film and cam means for operating said claw to feed the film intermittently, wherein means is provided to displace said claw to a position in which it is not engageable with the perforations of the film when a still picture is desired to be obtained on a screen.

It is another object of the present invention to provide a film projector of the character described above, wherein means is provided to advance the film one frame in the operation of the projector for still picture projection.

Namely, according to one aspect of the present invention, a film feed mechanism of a projector, comprising claw means adapted to engage with a row of perforations provided along a side edge of a film and cam means for bringing said claw means into engagement with said perforations of the film and then operating said claw means in the film feed direction to intermittently feed the film, is provided with still picture projecting means by which said claw means is moved away from the film and held against movement for engagement with the film perforations even when said cam means is operated.

According to another aspect of the invention, a film feed mechanism of the character described above is further provided with frame feed means which is selectively operated, under a condition in which said still picture projecting means is in an operative position holding said claw means at a location remote from the film, to release said still picture projecting means from its operative position thereby providing for feed of the film one frame and again bring the same into the operative position upon completion of the feed of one frame.

In a preferred embodiment of the present invention, the claw means consists of a claw member mounted on a fixed pin, extending from the frame of the projector, for pivotal and axial sliding movements thereon, while said cam means consists of a first cam member for causing a pivotal movement of said claw member to bring it into engagement of the film perforations and a second cam member for causing a sliding movement of said claw member on said shaft when said claw member is in engagement with the film perforations. The still picture projecting means consists of a lever pivotably mounted on the frame of the projector and this lever is selectively operated by an operating member engaging one end thereof, whereby the other end of said lever is brought into engagement with said claw member to cause a pivotal movement of the same in a direction to move away from the film. The aforesaid one end of the lever is formed with a step and said lever is pivotably moved to be released from engagement with the claw member when the engaging point of the operating member with said lever is displaced to said step. Means is provided to optionally displace the engaging point of the operating member to the stepped end portion of the lever as desired, thereby to provide for engagement of the claw member with the film, and return the same to its original position, upon completion of the feed of one frame, so as to stop feed of the film, during a still picture projecting operation.

DESCRIPTION OF THE PREFERRED EMBODIMENT

Figure 1:
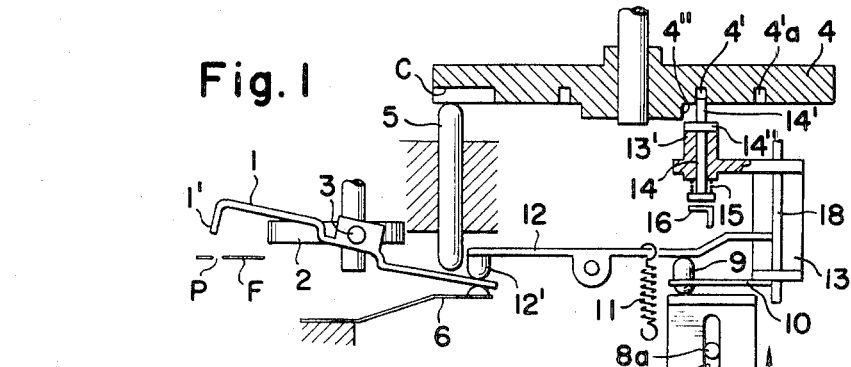
FIG. 1 is a plan view, partly in section, of a film feed mechanism embodying the present invention.
Figure 2:
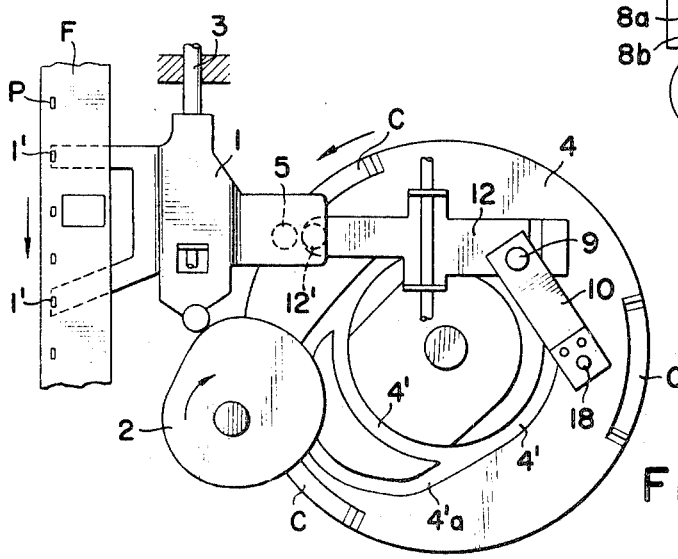
FIG. 2 is a front view of the film feed mechanism of FIG. 1.
Figure 3A:
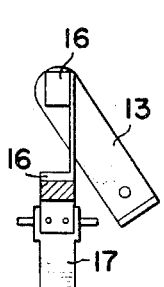
FIGS. 3a, and 3b and 3c are views showing the operation of lever operating means.
Figures 3B, 3C:
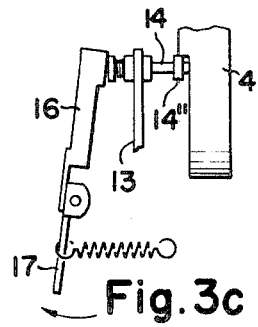

Referring first to FIGS. 1 and 2, a claw member 1 is mounted on a pin 3, supported on the frame of the projector, at an intermediate point thereof for pivotal and axial sliding movement on said pin. The claw member 1 has hook-shaped claws 1' formed at the left side end thereof which are adapted to engage perforations P of a film F when said claw member is caused to make a pivotal movement in a counterclockwise direction as viewed in FIG. 1. Means for causing the pivotal movement of the claw member 1 consists of a disc-shaped cam 4 having cam surfaces C on one side thereof and a cam follower 5 longitudinally slidably extending through the frame of the projector, said cam follower 5 being located at such a position that it will engage the right end portion of the claw member 1. A cam 2 is provided for causing an axial sliding movement of the claw member 1 on the pin 3. This cam 2 is in engagement with the claw member 1 at its peripheral surface. A spring 6 is provided for biasing the claw member 1 so as to cause a pivotal movement of said claw member in a counter-clockwise direction as viewed in FIG. 1, and another spring is provided to urge the claw member 2 towards the cam 2, though not apparent in FIG. 1.

The above-described construction of the film intermittent feed mechanism in a projector is well known and the film F is advanced intermittently by the claw member 1 when said claw member is caused to make a pivotal and sliding movements by the cams 2 and 4 continuously rotating in the directions of arrows in FIG. 2 respectively.

In the present invention, there is provided means for retaining the claw member 1 in a position shown in FIG. 1, upon clockwise pivotal movement of said claw member, so as to immovably hold the film F even when the cams 2 and 4 are rotated. This means includes a lever 12 pivotably mounted on the frame of the projector at an intermediate point thereof. The lever 12 is provided with a projection 12' at its left end extremity for engagement with a projection 12' at its left end extremity for engagement with the right end portion of the claw member 1. Rightwardly of the lever 12 is provided a member 13 of substantially U-shaped cross section which is pivotably mounted on a horizontal pin 18 secured to the frame of the projector. A plate spring 10 is fixed to one of flanges of the member 13 at one end and provided with an operating pin 9 at the other end thereof, which pin is in engagement with the right end portion of the lever 12. A sliding plate 8 having a pair of slots 8b is provided on one side of the plate spring 10, with a pair of pins 8a, projecting from the frame of the projector, received in said slots respectively. The sliding plate 8 is operated by a cam 7 to cause a pivotal movement of the lever 12 in a counterclockwise direction as viewed in FIG. 1, through the operating pin 9. A spring 11 is provided to bias the lever 12 so as to cause a clockwise pivotal movement of said lever.

The other flange of the U-shaped member 13 is formed at its end extremity with a boss 13' and a pin 14 projecting towards one side face of the cam 4 is longitudinally slidably received in said boss. The pin 14 is biased by a spring 15 in a direction to move away from the cam 4 or in a retracting direction and the retraction of sand pin 14 is limited by an annular flange 14" mounted on said pin and engaging the end face of the boss 13'.

Figure 4:
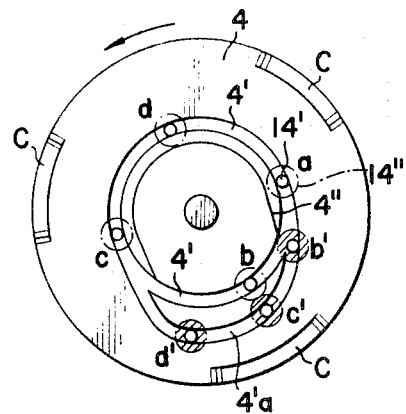
FIG. 4 is a side view of a claw sliding cam.

In the surface of that side of the cam 4 which confronts the pin 14 is formed a groove 4' for receiving an end 14' of said pin. As shown in FIG. 4, the groove 4' is concentric with the axis of rotation of the cam 4 and the end 14' of the pin 14 is normally received in this groove. In the same side surface of the cam 4 is also formed an arcuate groove 4a' which communicates the annular groove 4' at both ends thereof and extends outwardly of said annular groove. Inwardly of the groove 4' is formed a cam surface 4" having a lobe extending towards the arcuate groove 4a'. In FIG. 1, numeral 16 designates a member by which the pin 14 is pushed towards the cam 4. When the pin 14 is pushed towards the cam 4, the annular flange 14" of said pin engages the cam surface 4" and the end 14' of the pin 14 is shifted from the groove 4' to the groove 4a' incident to rotation of the cam 4.

The film feed mechanism constructed as described above operates in the following manner; Namely, the lever 12 is normally disengaged from the claw member 1 under the biasing force of the spring 11, so that the film intermittent feed mechanism performs its normal operation, feeding the film F intermittently. Now, when feed of the film is desired to be stopped to obtain a still picture, the cam 7 is rotated to push the sliding plate 8 in the direction of arrow in FIG. 1. The sliding plate 8 causes the lever 12 to make a counterclockwise pivotal movement through the pin 9, and the lever 12 in turn causes a clockwise pivotal movement of the claw member 1, with the result that the claws 1' are disengaged from the film F. In this position, the claw member 1 no longer undergoes the action of the cam 4 and hence the film F stops running.

Figure 5:
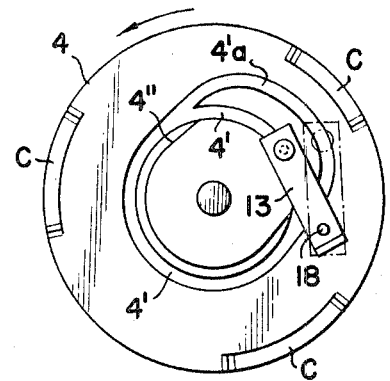
FIG. 5 is a schematic view showing the relationship between a control member for controlling a lever operating member of still picture projecting means and the claw sliding cam.
Figure 6:
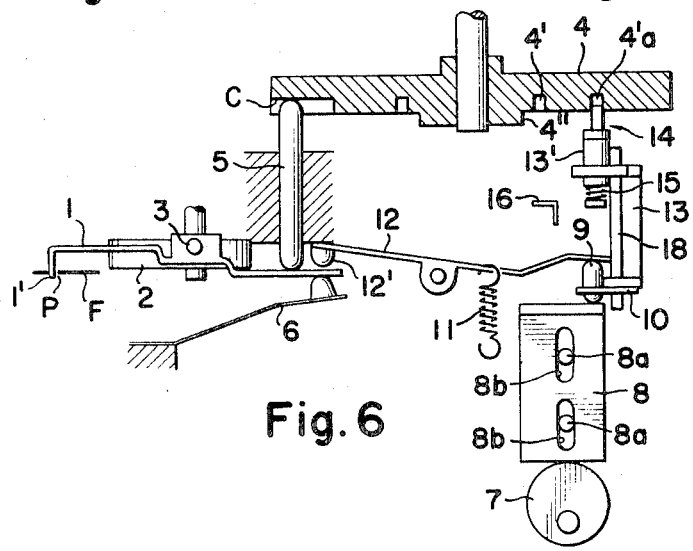
FIG. 6 is a plan view, similar to FIG. 1, showing a position of the film feed mechanism of FIG. 1 for advancing a film one frame during a still picture projecting operation.
Figure 7A:
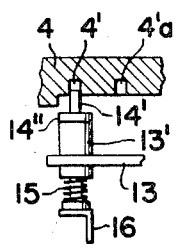
FIGS. 7a, 7b, 7c and 7d are views showing the relative position of the control member and the claw sliding cam in various stages of the one frame advancing operation.
Figure 7B:
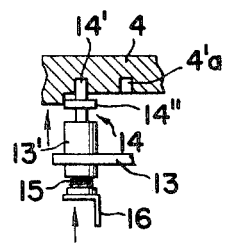
Figure 7C:
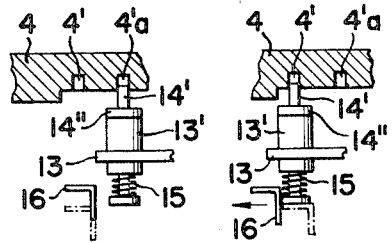
Figure 7D:
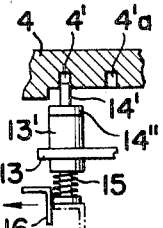

When it is desired to advance the film one frame under the condition described above, the pin 14 is pushed towards the cam 4 by the member 16 and a member 17 connected thereto, whereupon the annular flange 14" of the pin 14 is brought into engagement with the cam surface 4" and by the cooperation of said annular flange and said cam surface, and end 14" of the pin 14 moves into the groove 4a' from the groove 4' incident to the rotation of the cam 4, as stated previously. As a result, the member 13 is turned around the pin 18 to take a position indicated by the broken line in FIG. 5 and accordingly the pin 9 at the left end extremity of the plate spring 10 is displaced to a corresponding position close to the right side end of the lever 12. Since the step is formed at the right end portion of the lever 12, said lever 12 is caused to make a clockwise pivotal movement under the biasing force of the spring 11, thus releasing the claw member 1 from engagement therewith. Therefore, the claw member 1 is rocked by the action of the cam 4, to feed the film F. When the cam 4 has completed its full turn and therefore, the film F has been advanced on frame, the pin 14 is again in engagement with the groove 4' and accordingly the lever 12 is in the position shown in FIG. 1, so that the claw member 1 is locked in an inoperative position. If the member 16 has not been returned to its original position in this case, the pin 14 will collide against said member 16 but no trouble will result since the member 16 consists of a plate spring and is free to bend in both the right and left direction as viewed in FIGS. 1 and 6.

As will be apparent from the foregoing description, according to the present invention it is possible to obtain a still picture by a very simple mechanism and further it is possible to advance the film one frame as required by a simple operation.

Although the present invention has been described and illustrated herein with reference to a specific embodiment thereof, it is to be understood that many modifications and changes may be made in the detailed construction without deviating from the scope of the invention as defined in the appended claims.

1. In a film projector, a film intermittent feed mechanism said mechanism comprising; claw means adapted to engage a row of perforations provided along a side edge of the film in said projector; cam means operatively engageable with said claw means for positioning said claw means into engagement with said film perforations and to thereby intermittently feed the film, still picture projecting means adapted to retain said cam means in a position in which said claw means is disengaged from said film perforations even when said cam means is operated whereby feed of the film is stopped so as to project a still picture; and means adapted to be actuated during a still picture projecting sequence for advancing the film one frame said advancing means comprising a pin having an annular flange engageable with said cam means, spring-biased lever means connected to said claw means having pivotal motion imparted thereto in response to actuation of said lever means by said pin so as to release said claw means and advance said film one frame, and said pin engaging said cam means for locking said claw means into a stationary position after said film completes its advance.

2. In a film projector, a film intermittent feed mechanism said mechanism comprising a claw member pivotably and slidably mounted on a pin at an intermediate point thereof and having claws formed at one end for engagement with film perforations; first cam means rotatably acting on the other end portion of said claw member to impart a pivotal movement to said claw member about said pin; second can means for effecting a sliding movement of said claw member along said pin when the claws of said claw member have been brought into engagement with the film perforations upon pivotal movement of said claw member so as to advance the film; means for stopping feed of the film by acting on said other end portion of said claw member to impart a pivotal movement to said claw member releasing the film from engagement therewith and disengaging said claw member from said first cam means, said feed stopping means including a pivotably mounted lever, said lever having one end adapted to engage said other end portion of said claw member, lever-operating means for effecting a pivotal movement of said lever to actuate said other end of said claw member so as to impart a pivotal movement of said claw member for releasing the film from engagement with the claws of said claw member; and means for advancing the film one frame during a still picture projecting sequence, said advancing means being adapted to release said lever from said lever-operating means for a portion of the time interval required for a complete revolution of said first cam means said advancing means comprising a pin having an annular flange engageable with said cam means, spring-biased lever means connected to said claw means having pivotal motion imparted thereto in response to actuation of said lever means by said pin so as to release said claw means and advance said film one frame, and said pin engaging said cam means for locking said claw means into a stationary position after said film completes its advance.

* * * * *